(12) United States Patent
Nitta et al.

(10) Patent No.: US 6,254,436 B1
(45) Date of Patent: *Jul. 3, 2001

(54) ELECTRICAL CONNECTOR FOR AUTOMOTIVE LAMP

(75) Inventors: Kazuto Nitta; Hironori Tsukamoto; Masatoshi Yoneyama, all of Shizuoka (JP)

(73) Assignee: Koito Manufacturing Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/209,037

(22) Filed: Dec. 10, 1998

(30) Foreign Application Priority Data

Dec. 10, 1997 (JP) .................................................. 9-339618

(51) Int. Cl.⁷ ................................................... H01R 13/502
(52) U.S. Cl. .............................................. 439/689; 439/850
(58) Field of Search ..................... 439/689, 850, 439/596, 701, 682, 686, 854, 855, 459, 849

(56) References Cited

U.S. PATENT DOCUMENTS

| | | | |
|---|---|---|---|
| 3,332,053 | * 7/1967 | Busler | 439/596 |
| 3,534,325 | * 10/1970 | Jullien-Davin | 439/709 |
| 3,777,301 | * 12/1973 | Michaels | 439/855 |
| 4,461,528 | 7/1984 | Durand et al. | 439/409 |
| 4,758,185 | 7/1988 | Reuss | 439/701 |
| 5,038,199 | 8/1991 | Igarashi | 357/81 |
| 5,122,077 | * 6/1992 | Maejima et al. | 439/701 |
| 5,295,857 | 3/1994 | Toly | 439/395 |
| 5,676,564 | 10/1997 | Kobayashi et al. | 439/509 |

FOREIGN PATENT DOCUMENTS

| | | | |
|---|---|---|---|
| 0 187 255 | 7/1986 | (EP) | H01R/13/436 |
| 2638575 | 11/1988 | (FR) | H01R/13/62 |
| WO 83/02690 | 1/1983 | (WO) | H01R/13/658 |
| 96/36092 | 11/1996 | (WO) | H01R/13/422 |

* cited by examiner

Primary Examiner—Tulsidas Patel
(74) Attorney, Agent, or Firm—Sughrue, Mion, Zinn, Macpeak & Seas, PLLC

(57) ABSTRACT

An electrical connector for an automotive headlamp includes a connector housing formed from an insulating material and electrical terminals which are electrically conductive and inserted into the respective sleeves of the connector housing. Respective planar connecting portions of the electrical terminals are disposed in the same plane and are disposed to as to about a plane in which corresponding external terminals provided in the lamp are disposed. Thus, the length of the connector housing in the direction perpendicular to the plane of the planar connecting portions can be reduced, thereby reducing the width of the electrical connector. As a result, the overall height of the headlamp can be reduced.

19 Claims, 8 Drawing Sheets

FIG. 4(b) SEC A-A

FIG. 4(c) SEC B-B

SEC C-C

SEC D-D

SEC E-E

PRIOR ART

ELECTRICAL CONNECTOR FOR AUTOMOTIVE LAMP

BACKGROUND OF THE INVENTION

The present invention relates to an electrical connector for use with an automotive lamp unit. More particularly, the invention relates to an electrical connector having a reduced outer width so as to be received within a lamp unit of reduced depth.

Conventionally, a detachable electrical connector is employed for electrically connecting an automotive lamp to a power supply. FIG. 6 is a cross-sectional view of an example of an automotive lamp unit employing an electrical connector, specifically, an example of an automotive headlamp of the type having a discharge bulb. In this drawing, a headlamp 5 includes a discharge bulb 54 mounted on a reflector 55 disposed within a lamp chamber 53 defined by a lamp body 51 and a lens 52. A lighting circuit module 6' for activating the discharge bulb 54 is accommodated in a lower region of the lamp chamber 53 in a gap-like chamber 57 defined by the bottom 511 of the lamp body 51 and an extension member 56 extending from the reflector 55 to the open side of the lamp. This lighting circuit module 6' incorporates circuit elements such as a starter circuit for controlling the lighting of the discharge bulb 54, a stabilizing circuit and a control circuit (not shown). The lighting circuit module 6' is electrically connected to the discharge bulb 54 by a shielded cable 9. The lighting circuit module 6' is provided with an external terminal block (to be described later) to which an electrical connector 7 is detachably connected. The electrical connector 7 is electrically connected to a second connector 91 secured to a cover 10 detachably mounted to the rear of the lamp body 51 via insulated wires 37. The second connector 91 can be connected to a further electrical connector which is in turn electrically connected to the battery of the automobile.

FIG. 7 is a perspective view showing the structure of the electrical connector 7. Two flat external terminals 62, 63 project from the side wall of the case 61 of the lighting circuit module 6' parallel to one another with their respective flat portions 64 lying substantially in parallel planes. The terminals 62, 63 are arranged generally parallel to the bottom 511 of the lamp body 51.

The electrical connector 7 includes a connector housing 8 formed from an insulating material. The connector housing 8 is constituted by two angular sleeves 81, 82 which are integrally arranged parallel to one another. Two electrically conductive electrical terminals 31, 32 are inserted into the respective angular sleeves 81, 82 through respective ones of the openings so as to be secured therein.

The aforementioned electrical terminals 31, 32 have conventionally been so-called flag-type terminals, as shown in FIG. 8. Each of the electrical terminals 31, 32 includes a planar connecting portion 33 to be electrically connected to a flat portion 64 of the corresponding one of the external terminals 62, 63 of the lighting circuit module 6'. The planar connecting portion 33 includes a rectangular flat portion 34 and a bent portion 35 formed by bending both side edges thereof inward into a J-like shape. By inserting each of the external terminals 62, 63 into the space between the flat portion 34 and the bent portions 35, the flat portion 34 and the bent portions 35 of the planar connecting portion 33 are brought into contact with the flat portion 64 of the external terminals 62, 63, respectively, for making electrical connection. Moreover, one end of each wire 37 is connected to one end 36 in a longitudinal direction of the planar connecting portion 33 for electrical connection. The insulated wires 37 extend from the connector housing 8 in the same direction.

In the aforementioned conventional electrical connector, the flat portions 64 of the pair of external terminals 62, 63 projecting from the lighting circuit module 6' are disposed so as to face each other, while extending perpendicular with respect to the bottom of the lamp body 51. Likewise, the planar connecting portions 33 of the pair of electrical terminals 31, 32 of the electrical connector 7 are disposed to face with each other. Accordingly, it is difficult to reduce the width of the electrical connector 7 (the length in the direction of height of the lighting circuit module 6' is hereinafter referred to as the width of the connector 7), that is, the width across the distance between facing electrical terminals, owing to the gap therebetween. In order to connect the aforementioned electrical connector 7 to the external terminals 62, 63 of the lighting circuit module 6' within the headlamp 5, the chamber defined between the bottom of the lamp body 51 and the extension member 56 must have a relatively great height. As a result, the height of the headlamp 5 cannot be sufficiently reduced, thus increasing the overall size of the lamp and restricting the design of the headlamp 5.

In order to solve the aforementioned problem, it is possible to rotate the external terminals 62, 63 of the lighting circuit module 90 degrees with respect to those of the aforementioned structure such that the pair of external terminals 62, 63 face with each other in the transverse direction of the headlamp 5, and a pair of electrical terminals 31, 32 of the electrical connector 7 face each other in the transverse direction. In this case, the restriction on the width of the electrical connector 7 due to the distances between the external terminals 62 and 63 and distance between the electrical terminals 31 and 32 can be relaxed somewhat, thus reducing the height of the headlamp 5 to some extent. In such a case, however, the width of the connector housing 8 cannot be made less than the length of the shorter side of the planar connecting portions 33 of the electrical terminals 31, 32. Therefore, the width of the electrical connector 7 cannot be reduced as much as desired, nor can the height of the headlamp 5 be sufficiently reduced. Moreover, as the electrical terminals 31, 32 of the electrical connector 7 are exposed outside the connector housing 8, short-circuiting of the electrical terminals can easily occur, and safety problems, such as electric shock, cannot be entirely avoided.

SUMMARY OF THE INVENTION

It is an object of the present invention to provide an electrical connector having sufficient safety and reliability, and yet which allows a decrease in the headlamp height by reducing the width of the connector.

According to the present invention, an electrical connector includes a connector housing formed from an insulating member and a plurality of electrically conductive electrical terminals each having a planar connecting portion inserted into the connector housing. Each of the planar connecting portions of the electrical terminals are disposed in the same plane. The insulated wires connected to the electrical terminals extend outward from the connector from the same side of the connector housing and in a direction parallel to the plane of the terminals. The connector housing includes a main body having sleeves for receiving respective electrical terminals through openings formed in a base portion of the main body, a lid for covering the openings of the main body, and a hinge portion connecting the lid and to the main body. The hinge is formed on the side of the main body opposite the side from which the insulated wires exit the housing.

The invention further provides a lighting circuit device employing the above connector, including a molded lighting circuit module case, and a pair of terminals extending outward from a side surface of the case. These terminals, which are also generally planar and lie in the same plane, make electrical contact with respective ones of the terminals of the electrical connector.

Still further, the invention provides an automotive lamp employing the above connector and lighting circuit device. The lamp is of the type having a lamp body and a lens assembled to the lamp body, with the lamp body having a bottom wall, and with a lamp chamber being defined by the assembled lamp body and lens. A reflector is mounted within the lamp chamber, and a discharge lamp is mounted on the reflector. An extension member defines a gap-like chamber between the bottom wall of the lamp body and the extension member, and the lighting circuit module is mounted in the gap-like chamber.

DESCRIPTION OF THE PREFERRED EMBODIMENTS

Figure 1:
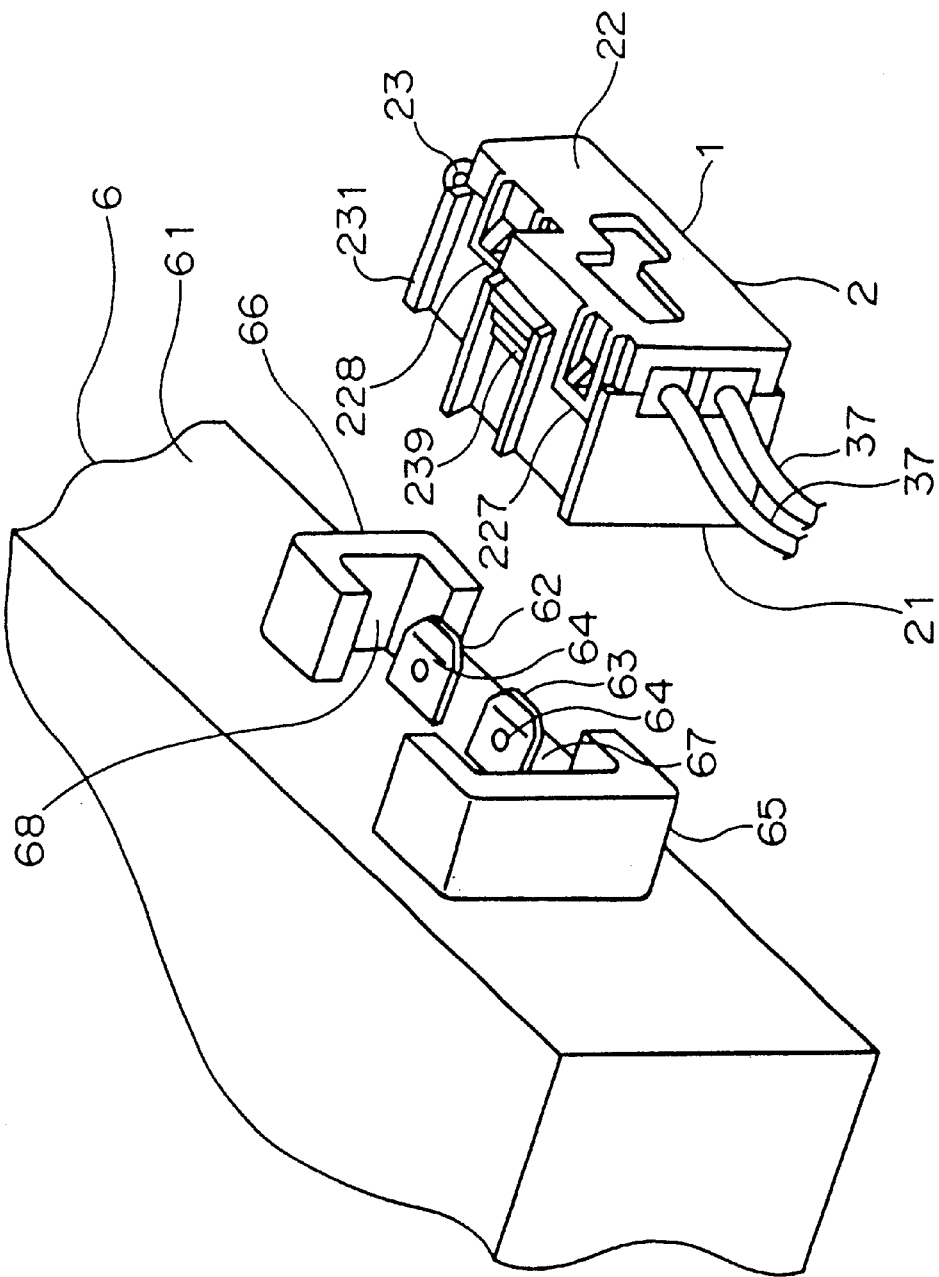
FIG. 1 is a perspective view showing an outer appearance of an electrical connector constructed according to a preferred embodiment of the present invention.
Figure 6:
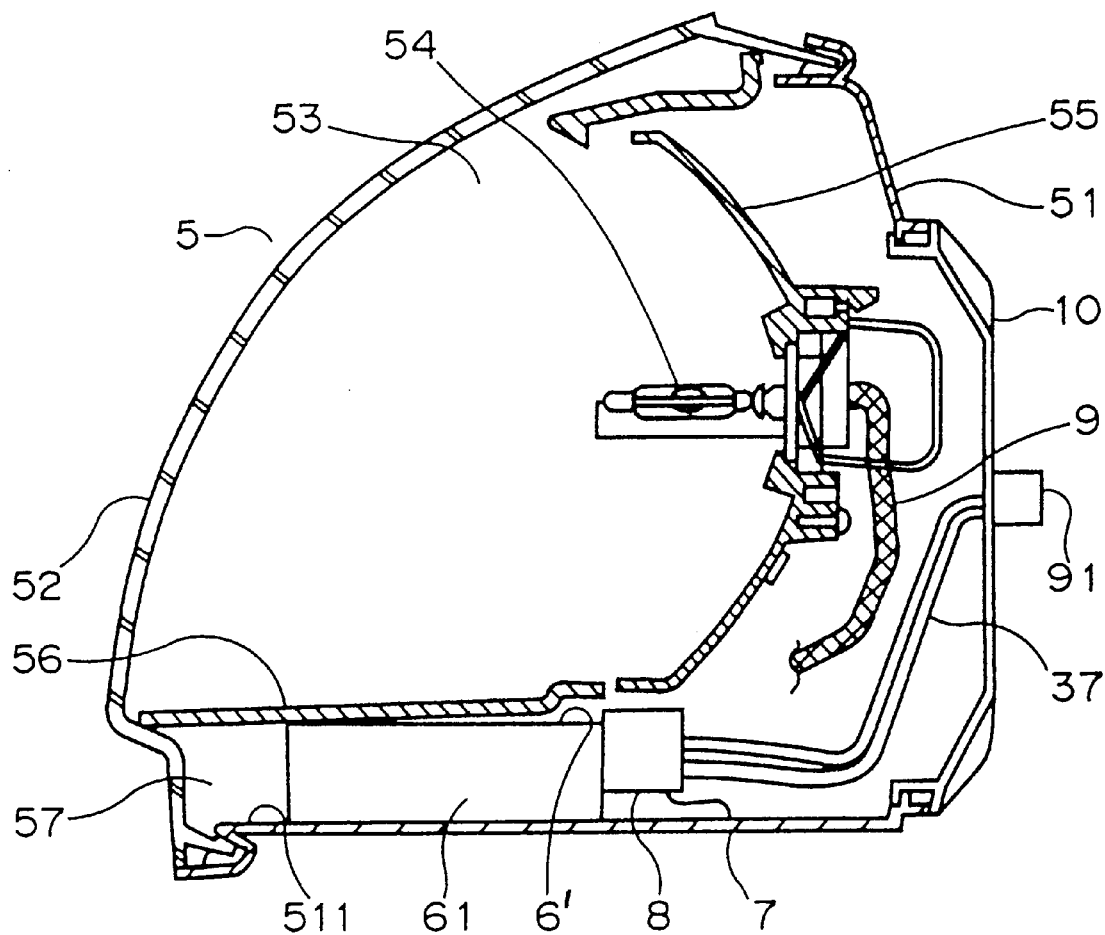
FIG. 6 is a cross-sectional view showing an example of a conventional lamp unit.
Figure 7:
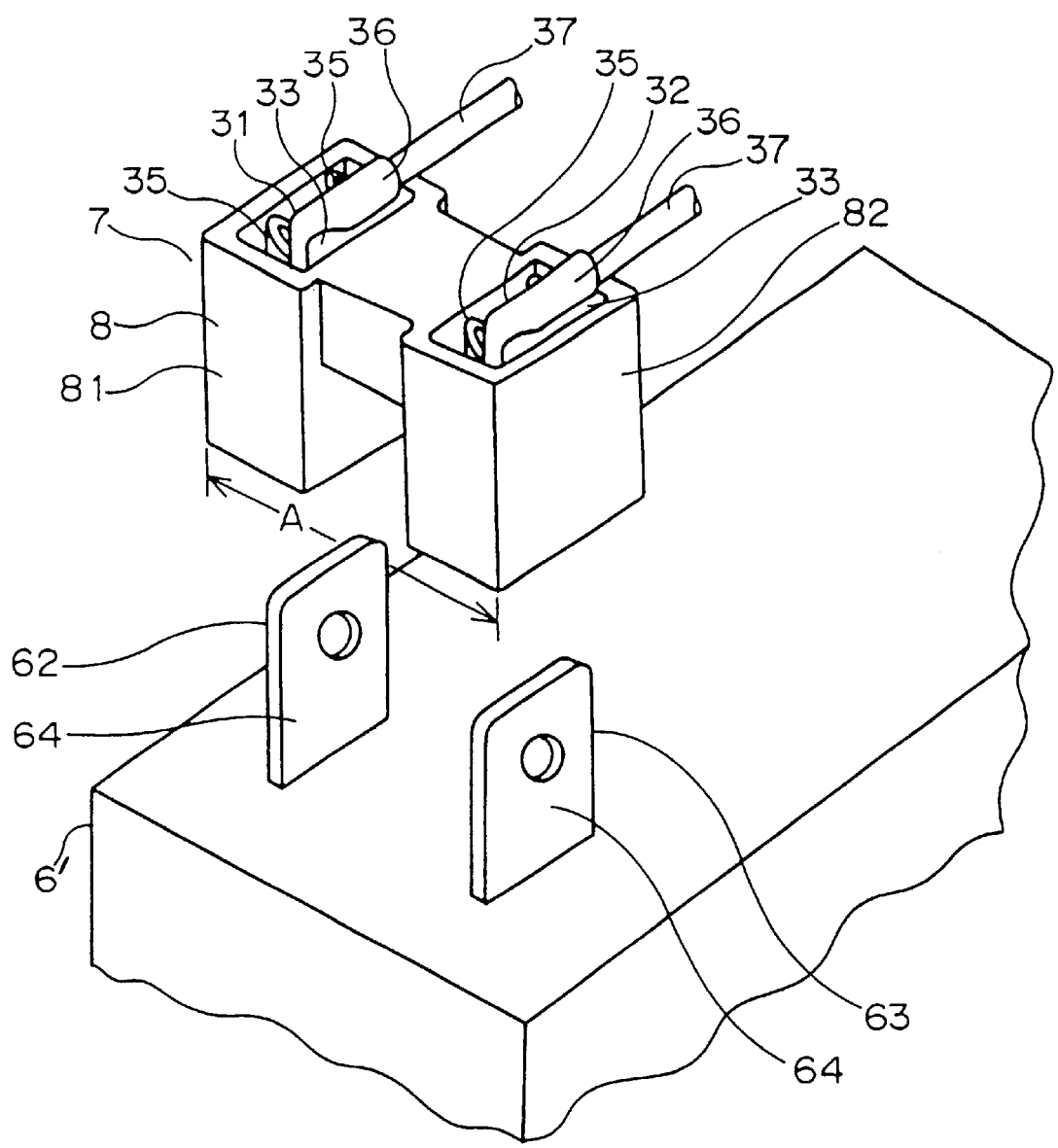
FIG. 7 is a perspective view showing the outer appearance of an example of a conventional electrical connector.

Hereinafter, a preferred embodiment of the present invention will be described with reference to the drawings. FIG. 1 is a perspective view showing the outer appearance of a main part of an electrical connector of the present invention which is applied to the headlamp 5 shown in the manner depicted in FIG. 6. An electrical connector 1 is structured to be detachably connected to a pair of external terminals 62, 63 projecting from a lighting circuit module 6. As described in detail below, the external terminals 62, 63 are disposed such that the flat portion 64 of each terminal is arranged in a plane parallel to the bottom wall of the lamp body 51 of the headlamp 5.

Figure 2:
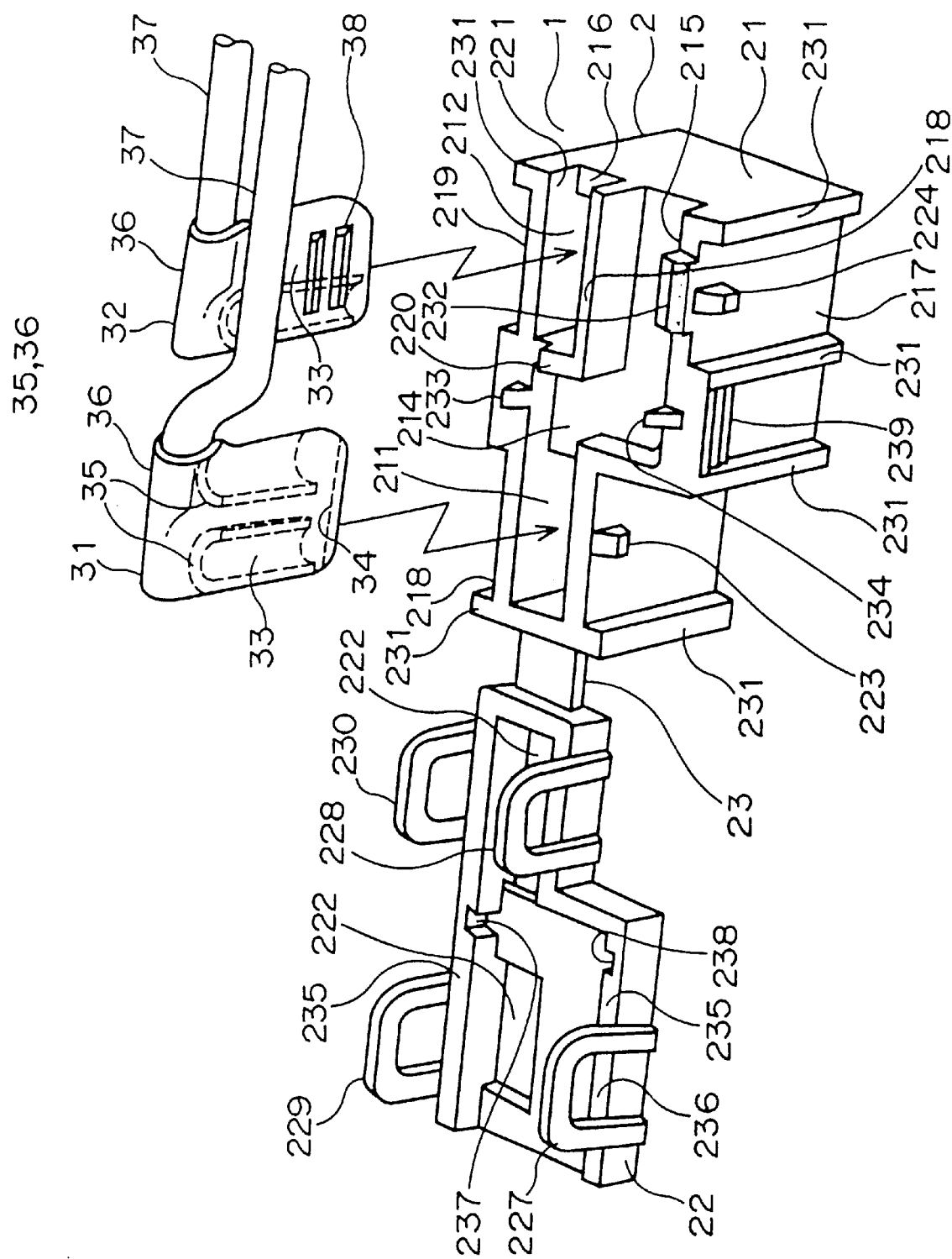
FIG. 2 is a plan view showing the electrical connector of FIG. 1 prior to the assembly.
Figure 8:
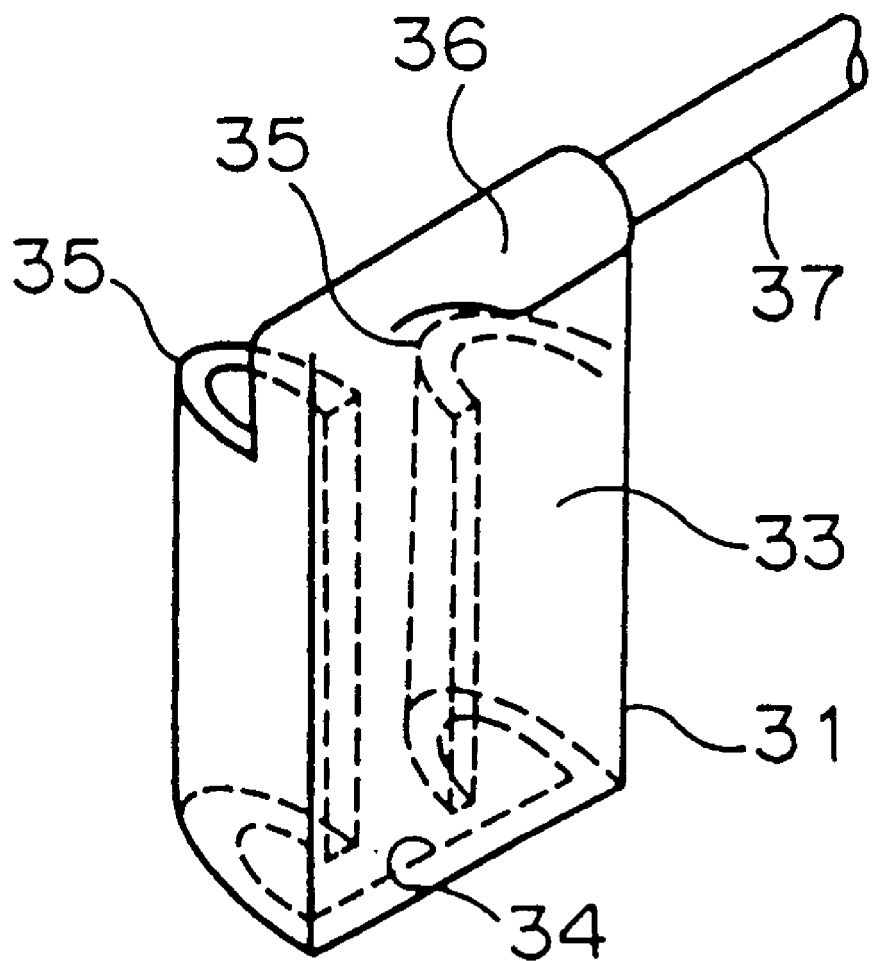
FIG. 8 is a perspective view showing the outer appearance of an example of a conventional electrical terminal.

As can be seen from FIG. 2 showing a partial exploded perspective view of the electrical connector 1, the electrical connector 1 is defined by a connector housing 2 formed by molding an insulating resin and two electrical terminals 31, 32 which are fitted and securely supported in the connector housing 2. As shown in FIG. 8, each of the electrical terminals 31, 32 includes an electrically conductive planar connecting portion 33. The planar connecting portion 33 has a rectangular flat portion 34 and bent portions 35 formed by bending both side edges of the flat portion 34 inward into a J-like shape. In addition, one end of each insulated wire 37 is stripped of insulation and secured in one of the longitudinal ends 36, of the respective planar connecting portion 33. The aforementioned structure is the same as that of the conventional art.

According to the present embodiment, however, as shown in FIG. 2, a plurality of slits 38 are provided in each flat portion 34 arranged at a predetermined interval in the longitudinal direction of the flat portion 34. As a result, elasticity is obtained for improving the electric contact at the insertion of the external terminals 62, 63.

Figure 3:
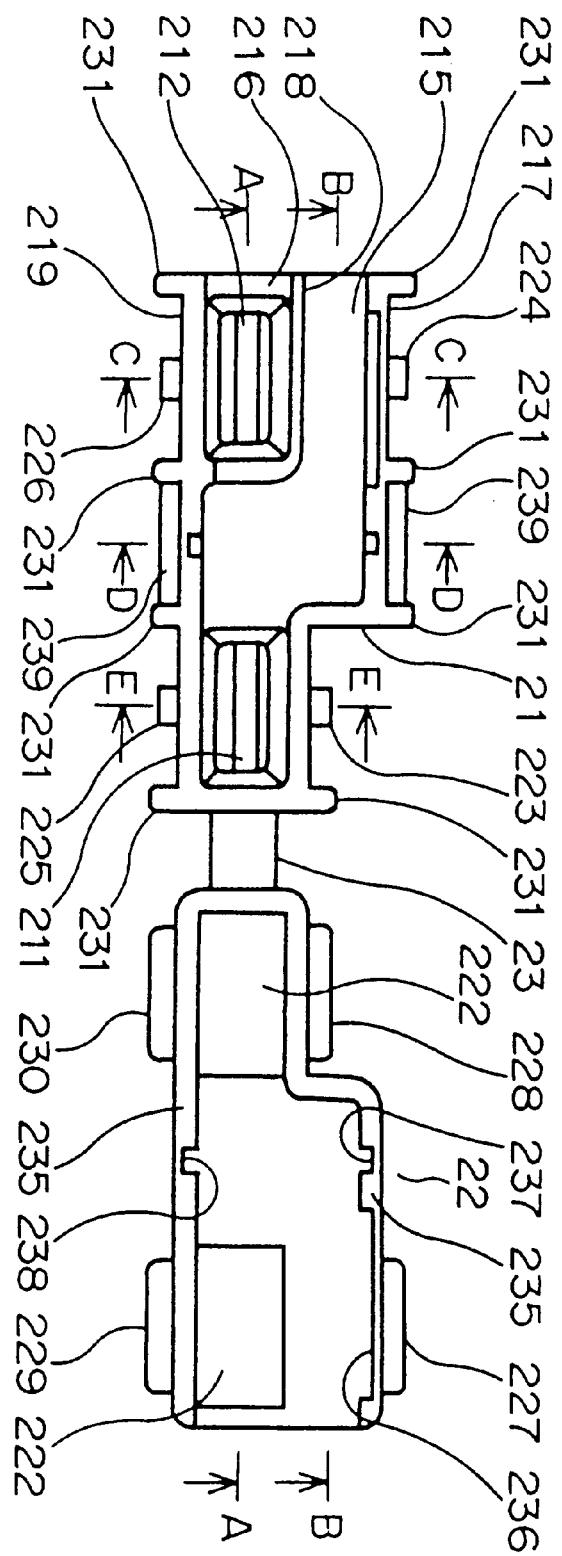
FIG. 3 is a plan view showing a connector housing of FIG. 1 prior to the assembly.
Figure 4A:
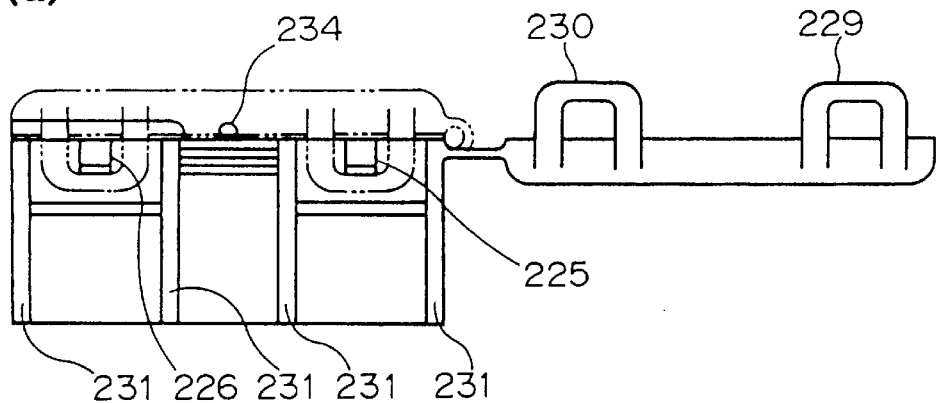
FIG. 4(a) is a front view of the connector housing of FIG. 3, and FIGS. 4(b) and 4(c) are cross-sectional views taken along lines A—A and B—B, respectively, in FIG. 3.
Figure 4A:
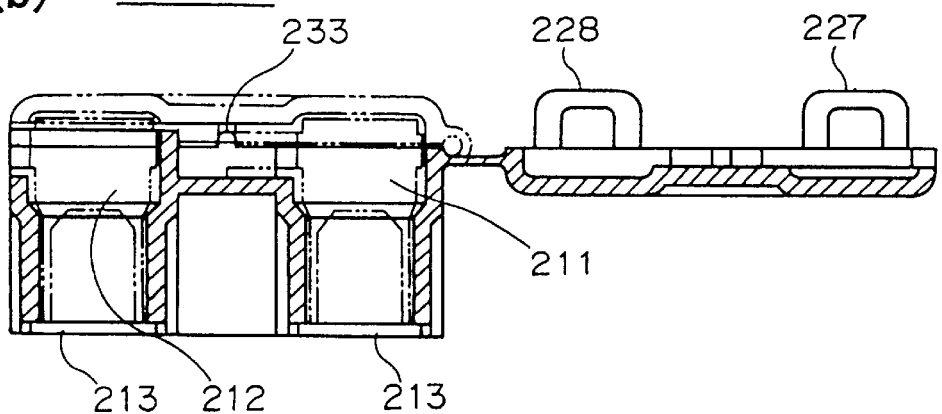
Figure 4A:
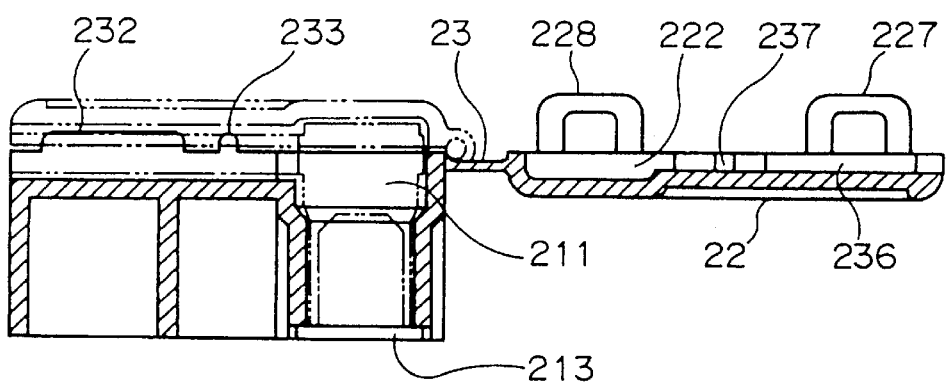
Figure 5A:
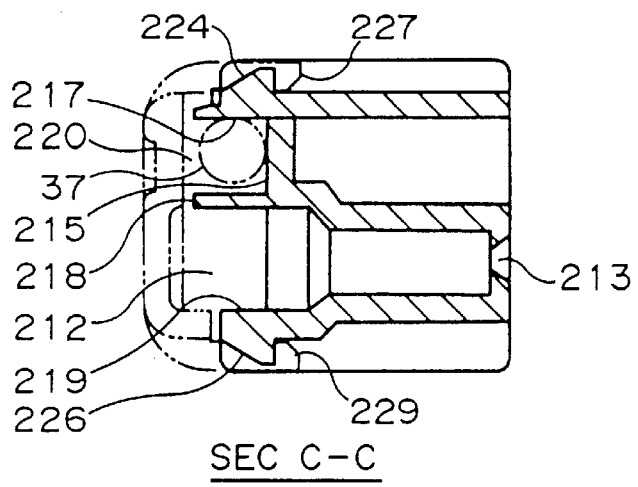
FIGS. 5(a) to 5(c) are cross-sectional views taken along lines C—C, D—D and E—E, respectively, in FIG. 3.
Figure 5B:
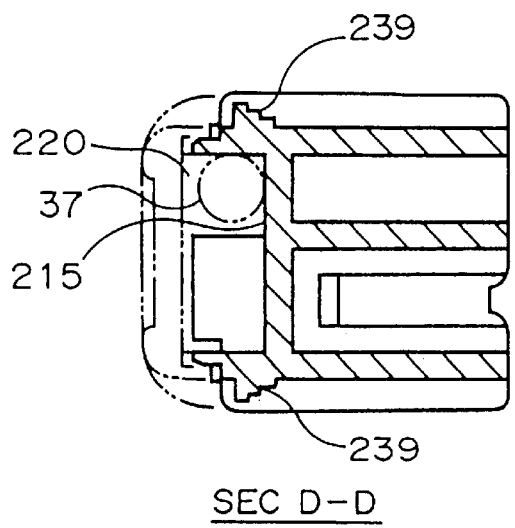
Figure 5C:
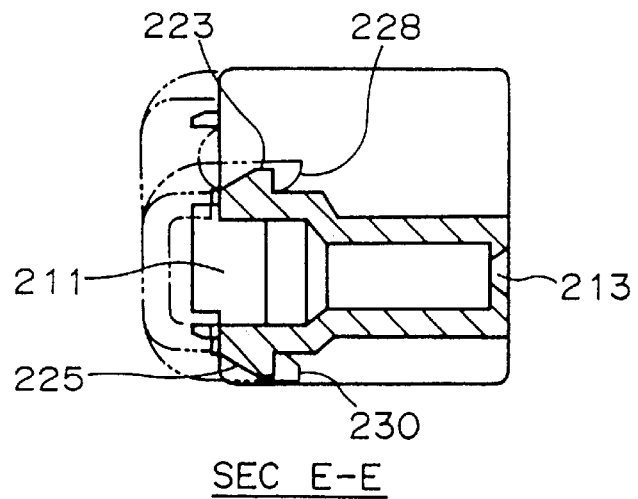

As shown in a plan view in FIG. 3, a front view and cross-sectional views taken along lines A—A and B—B of FIG. 3 in FIGS. 4(a), 4(b) and 4(c), and cross-sectional views taken along lines C—C, D—D and E—E of FIG. 3 in FIGS. 5(a), 5(b) and 5(c), respectively, the connector housing 2 is formed of a main body 21 and a lid 22, which are integrated with a hinge 23. The lid 22 is brought into abutment with a base portion of the main body 21 by elastic deformation of the hinge 23. The abutment state is maintained by engagement between external lances and engagement pieces, as will be described below.

The main body 21 is constituted by a first sleeve 211 and a second sleeve 212, each having a different width and integrally disposed adjacent one another. In the present embodiment, the width of the first sleeve 211 is slightly smaller than that of the second sleeve 212 in order to allow the electrical terminals 31, 32 to be inserted into the respective sleeves 211, 212, each of which has an inner width slightly larger than that of the planar connecting portion 33. Openings 213 for receiving the external terminals 62, 63 are formed at the tops of the sleeves 211, 212, respectively. The opening 213 is smaller than the outer size of the electrical terminals 31, 32 so as to firmly retain the terminals. These two sleeves 211, 212 are disposed relative to the external terminals 62, 63 in such a manner that the planar connecting portions 33 of the electrical terminals 31, 32 are disposed in the same plane, separated by a predetermined interval, when being inserted into the sleeves 211, 212.

Support portions 215, 216 for supporting the insulated wires 37 secured to the electrical terminals 31, 32 are formed in each base portion 214 of the two sleeves 211, 212, respectively. One of the support portions, i.e., the support portion 215, is constituted by a passage-like groove 220 defined by walls 217 and 218, each having substantially an L shape. Each of the walls 217, 218, which are formed as an integral part of the base portion 214, extends vertically in the direction in which the electrical terminal 31 is inserted from the surface of the base portion 214 into the sleeve 211. This passage-like groove 220, which has substantially an L shape, receives the insulated wire 37 secured to the electrical terminal 31 inserted into the sleeve 211. The other support portion 216 is constituted by a groove 221 which is defined by walls 218, 219, each of which is formed as an integral part of the base, portion 214, and extends vertically in the direction in which the electrical terminal 32 is inserted from the surface of the base 214 into the sleeve 212. The insulated wire 37 secured to the electrical terminal 32 is set in the groove 221.

The insulated wires 37 secured to the respective electrical terminals 31, 32 extend in the same direction from the respective support portions 215, 216, that is, in the direction in which the electrical terminals 31, 32 are closely arranged parallel to one another. Accordingly as described above, by fixing the lid 22 to the base portions 214 while bending the hinge 23, the insulated wires 37 are secured between the lid 22 and respective ones of the support portions 215, 216. It should be noted that recesses 222 for receiving the portions of the external terminals 31, 32 to which the insulated wires 37 are secured are formed in the inner surface of the lid 22.

In addition, pairs of outward projecting external lances 223, 224, 225, 226 are formed on the respective outer surfaces of the base portion of 214 of the connector housing 2, each functioning to engage respective arc-shaped engagement pieces 227, 228, 229, 230 formed on the periphery of the lid 22. A pair of projecting walls 231 extending from the base portion 214 to the bottom of the main body 21 are formed on both sides of each of the lances 223, 224, 225, 226. The projecting walls 231 serve to position the arc-shaped engagement pieces 227, 228, 229, 230 and to protect against application of an external force thereto. In addition, a bar-shaped guide 233 projects from the top surface of the wall 218 formed at the top surface of the base portion 214, an elongated guide 232 extending in the longitudinal direction of the wall 217, and a bar-shaped guide 234 are formed so as to project from the top surface of the wall 217. The outer surface of each of the guides 232, 233, 234 is cut diagonally toward the top thereof. Notches 236, 237, 238, each having a substantially U-shaped open portion, are formed in the inner peripheral surface of a vertical wall 235 which extends along the outer periphery of the lid 22. When the lid 22 is placed on the top surface of the base 214, the top portions of the guides 232, 233, 234 are received in respective ones of the notches 235, 236, 237. That is, the guides 232, 233, 234 are fitted in the respective notches 236, 237, 238, whereby the lid 22 is accurately positioned with respect to the base portion 214.

The hinge 23 is formed on the outer side surface of the base portion 214 of the main body 21 on the side opposite the surface from which the insulated wires 37 exit the connector. The hinge 23 has a small thickness for imparting elasticity. By bending the hinge 23, the lid 22 can be placed on the base portion 214 of the main body 21 to close the base portions 214 of the sleeves 211, 212.

The recesses 222 are formed in the inner surface of the lid 22. When the lid 22 is placed over the sleeves 211, 212 of the main body 21 and the support portions 215, 216, the recesses 222 receive the portions of the electrical terminals 31, 32 to which the insulated wires 37 are secured. The insulated wires 37 are secured between the recesses 222 and the support portions 215, 216. Moreover as described above, four projecting arc-shaped engagement pieces 227, 228, 229, 230 are formed on the outer surface of the lid 22. When the hinge 23 is bent to place the lid 22 on the main body 21, the engagement pieces 227, 228, 229, 230 formed on both sides of the lid 22 are brought into engagement with respective ones of the external lances 223, 224, 225, 226 provided on opposed sides of the main body 21. As a result, the lid 22 is fitted to the main body 21 such that the openings of the sleeves 211, 212 in the base portion 214 are closed.

A step-like grip portion 239 is formed on both side walls of the main body 21. The grip portions 239 allow an operator to firmly grip the connector housing 2 by the thumb and forefinger for attachment or detachment thereof to or from the external terminals 62, 63. The grip portions 239 are effective especially in providing a pulling force for detaching the electrical connector 1 from the external terminals 62, 63.

Referring again to FIG. 1, in the lighting circuit module 6, a pair of flat external terminals 62, 63 coupled to the inner circuitry within a resin case 61 project from a side wall thereof. The respective flat portions 64 of the terminals 62, 63 are closely arranged parallel to one another in substantially the same plane. A pair of substantially U-shaped guide walls 65, 66 are formed at the outer sides of the external terminals 62, 63, respectively. The guide wall 65 has a U-shaped first opening 67. The guide wall 66 likewise has a U-shaped second opening 68 having a width smaller than that of the first opening 67. The widths of the first and second openings 67, 68 correspond to those of the two sleeves 211, 212, respectively, of the connector housing 2. Accordingly, when attaching the electrical connector 1 to the external terminals 62, 63, the first sleeve 211 of the connector housing 2 is fitted in the second opening 68. Similarly, the second sleeve 212 of the connector housing 2 is fitted in the first opening 67. Thus, the guide walls 65, 66 serve to prevent incorrect fitting, that is, attachment of the electrical connector 1 to the external terminals 62, 63 in the wrong direction.

In the above-structured electrical connector 1, the respective planar connecting portions 33 of the electrical terminals 31, 32 are closely disposed parallel to one another in substantially the same plane for electrically connecting the electrical connector 1 to the external terminals 62, 63 having the flat portions 64 closely disposed parallel to one another also in substantially the same plane. With this structure, the thickness of the electrical terminals 31, 32 in the direction perpendicular to the plane of the planar connecting portion 33 can be reduced. More specifically, it is possible to reduce the width of the grip portion of the connector housing 2, which can be gripped by the thumb and forefinger of the operator without touching the insulated wires 37 so as to attach the electrical connector 1 to the external terminals 62, 63. Moreover, the insulated wires 37 secured at the ends 36 of the electrical terminals 31, 32 are set on the support portions 215, 216 of the grooves 220, 221 formed in the base portion 214 of the connector housing 2.

In the foregoing, as the insulated wires 37 extend outwardly from the connector in the same direction as the plane in which the electrical terminals 31, 32 lie, the aforementioned width can be further reduced. Accordingly, the overall height of the lighting circuit module 6 mounted within the headlamp 5 shown in FIG. 6 can be reduced, thus reducing the height of the headlamp 5. Consequently, design restrictions on the headlamp are relaxed.

Moreover, due to the step-like grip portions 239 formed on the side walls of the main body 21, the operator can firmly grip the sides of the connector housing 2 for connecting the connector housing 2 to the external terminals 62, 63, thus improving the operation of attaching and detaching the electrical connector 1 to and from the external terminals 62, 63.

In addition, the electrical terminals 31, 32 are inserted into the sleeves 211, 212 formed in the main body 21 of the connector housing 2, and then the lid 22 is placed over the sleeves 211, 212 by bending the hinge 23 such that the lid 22 and the main body 21 are integrated to close the top of the base portion 214 of the main body 21. Therefore for example, the portions of the electrical terminals 31, 32 to which the insulated wires 37 are secured are protected from exposure to the outside, and short-circuiting of the electrical terminals 31, 32, electrical shock and the like can be prevented. After inserting the electrical terminals 31, 32 into the sleeves 211, 212, the lid 22 is pressed tightly against the main body 21 while bending the hinge 23. At this time, notches 236, 237, 238 formed in the inner periphery of a solid wall 235 provided along the periphery of the lid 22 accommodate the long guide 232 and the bar-shaped guides 233, 234 formed on the base portion 214 of the main body 21. As a result, the lid 22 can be inserted reliably in position. Moreover, the engagement pieces 227, 228, 229, 230 formed on the side periphery of the lid 22 are elastically deformed outward over the external lances 223, 224, 225, 226 formed on the main body 21 for the respective engagement. As a result, the lid 22 can be completely closed. In particular, even if the hinge 23 is broken, attachment between the lid 22 and the main body 21 still can be maintained due to the engagement between the engagement pieces and the external lances. Still further, because the projecting walls 231 are located on both sides of the respective stop pieces 227, 228, 229, 230, the projecting walls 231 prevent an external force from being applied to the engagement pieces 227, 228, 229, 230 exposed to the outside, thus preventing the external force from disengaging the engagement pieces 227, 228, 229, 230.

In the present embodiment, a pair of substantially U-shaped guide walls 65, 66 for receiving the connector housing 2 are formed on the outer surface of the lighting circuit module 6 at the outside of the external terminals 62, 63. The guide walls 65, 66 have the first and second openings 67, 68 each having a different width so as to correspond to the widths of the first and second sleeves 211, 212, respectively. Therefore, the electrical connector 1 is prevented from being attached to the external terminals 62, 63 in the wrong direction to thus realize reliable attachment. It should be understood that, as the guide walls 65, 66 serve to guide the connector housing 2, they may be formed into a single, continuous frame, that is, as a generally rectangular sleeve with irregular shape.

In the above-described embodiment, the connector of the present invention is utilized for making connection to the external terminals of a lighting circuit device provided in a headlamp. However, the present invention may be applied to various other applications such as an electrical connector adapted to make connection to the external terminal of, for example, the connector of a light bulb or socket. Moreover, the present invention may be applied to an electrical connector containing three or more electrical terminals.

As has been described above, according to the present invention, the planar connecting portions of each of a plurality of electrically conductive electrical terminals, which are inserted into the connector housing formed from an insulating member, are disposed in the same plane. The present invention makes it possible to reduce the width of the electrical connector owing to the relaxed restriction on the length thereof in the direction perpendicular to the planar connecting portion. Therefore, it is possible to reduce the size of the lamp body to which the electrical connector is mounted. That is, it is possible to reduce the height of a lamp unit in which a lighting circuit device connected to the electrical connector is mounted in the bottom portion of the lamp body. As a result, restrictions on the lamp design can be relaxed. The electrical terminals inserted in the respective sleeves of the connector housing are shielded by the lid. Thus, the portions of the electrical terminals to which the insulated wires are connected are prevented from being exposed to the outside, thus preventing short-circuiting of the electrical terminals, electrical shock and the like.

What is claimed is:

1. An electrical connector for a vehicle lamp, comprising:
   a connector housing formed from an insulating material;
   a plurality of electrically conductive terminals each having a generally planar connecting portion inserted into said connector housing, said planar connecting portions of said plurality of electrically conductive terminals lying substantially in a single plane; and
   an insulated wire connected to each of said terminals, all of the insulated wires extending outward from a first side of said connector housing in a direction parallel to said plane,
   wherein said connector body comprises:
   a main body having sleeves formed therein for receiving respective ones of said terminals through respective openings formed in a base portion of said main body;
   a lid for covering said openings in said main body; and
   a hinge formed on a second side of said main body opposite said first side, said hinge connecting said lid to said main body,
   wherein a groove is formed in said base portion for guiding one of said insulated wires connected to a first of said terminals around a second of said terminals and out of said housing.

2. The electrical connector according to claim 1, further comprising two pairs of external outwardly projecting lances formed on opposed sides of an outer surface of said base portion of said main body, and two pairs of arc-shaped engagement pieces formed on opposite sides of a periphery of said lid, said engagement pieces engaging respective ones of said projecting lances to attach said lid to said main body.

3. The electrical connector according to claim 1, wherein said planar connecting portions are separated by a space of a predetermined interval, and are disposed in front of and in rear of said space.

4. A lighting circuit device for an automotive lamp, comprising:
   a lighting circuit module comprising:
      a molded lighting circuit module case; and
      a pair of terminals extending outward from a side surface of said case, said terminals being generally planar and lying in the same plane, and
      an electrical connector mating with said pair of terminals for connecting said lighting circuit module to make electrical connection to said pair of terminals, said electrical connector comprising:
         a connector housing formed from an insulating material; and
         a plurality of electrically conductive terminals each having a generally planar connecting portion inserted into said connector housing, said planar connecting portions of said plurality of electrically conductive terminals of said electrical connector lying substantially in a single plane, said electrically conductive terminals making electrical contact with respective ones of said terminals of said lighting circuit module; and
      an insulated wire connected to each of said terminals of said electrical connector, all of the insulated wires extending outward from a first side of said connector housing in a direction parallel to said single plane,
   wherein said connector body comprises:
   a main body having sleeves formed therein for receiving respective ones of said terminals through respective openings formed in a base portion of said main body;
   a lid for covering said openings in said main body; and
   a hinge formed on a second side of said main body opposite said first side, said hinge connecting said lid to said main body,
   wherein a groove is formed in said base portion for guiding one of said insulated wires connected to a first of said terminals around a second of said terminals and out of said housing.

5. The lighting circuit device according to claim 4, wherein each of said planar connecting portions has a rectangular flat portion and a pair of bent portions formed by bending side edges of flat portion inward into a J-like shape, a plurality of slits being provided in each flat portion arranged at a predetermined interval in a longitudinal direction of said flat portion.

6. The lighting circuit device according to claim 4, further comprising two pairs of external outwardly projecting lances formed on opposed sides of an outer surface of said base portion of said main body, and two pairs of arc-shaped engagement pieces formed on opposite sides of a periphery of said lid, said engagement pieces engaging respective ones of said projecting lances to attach said lid to said main body.

7. The lighting circuit device according to claim 4, wherein said main body, said lid and said hinge are integrally molded.

8. The lighting circuit device according to claim 4, wherein said connector housing further comprises a stepped grip portion formed on side walls of said main body.

9. The lighting circuit device according to claim 4, wherein said molded lighting circuit module case comprises a pair of generally U-shaped guide walls bracketing said terminals of said lighting circuit module.

10. The lighting circuit device according to claim 4, wherein said single plane faces and abuts said same plane.

11. The lighting circuit device according to claim 4, wherein one of said walls of said pair of walls has a U-shaped opening having a width larger than that of the other of said walls.

12. An automotive lamp comprising:
a lamp body assembly comprising:
a lamp body and a lens assembled to said lamp body, said lamp body having a bottom wall, a lamp chamber being defined by the assembled lamp body and lens;
a reflector mounted within said lamp chamber;
a discharge lamp mounted on said reflector; and
an extension member defining a gap chamber between said bottom wall of said lamp body and said extension member,
a lighting circuit module comprising:
a molded lighting circuit module case mounted in said gap chamber; and
a pair of terminals extending outward from a side surface of said case, said terminals being generally planar and lying in the same plane, and
an electrical connector mating with said pair of terminals for connecting said lighting circuit module to make electrical connection to said pair of terminals, said electrical connector comprising:
a connector housing formed from an insulating material;
a plurality of electrically conductive terminals each having a generally planar connecting portion inserted into said connector housing, said planar connecting portions of said plurality of electrically conductive terminals of said electrical connector lying substantially in a single plane, said electrically conductive terminals making electrical contact with respective ones of said terminals of said lighting circuit module; and
an insulated wire connected to each of said terminals of said electrical connector, all of the insulated wires extending outward from a first side of said connector housing in a direction parallel to said single plane,
wherein said connector body comprises:
a main body having sleeves formed therein for receiving respective ones of said terminals through respective openings formed in a base portion of said main body;
a lid for covering said openings in said main body; and
a hinge formed on a second side of said main body opposite said first side, said hinge connecting said lid to said main body.

13. The automotive lamp according to claim 12, further comprising two pairs of external outwardly projecting lances formed on opposed sides of an outer surface of said base portion of said main body, and two pairs of arc-shaped engagement pieces formed on opposite sides of a periphery of said lid, said engagement pieces engaging respective ones of said projecting lances to attach said lid to said main body.

14. The automotive lamp according to claim 12, wherein said single plane faces and abuts said same plane.

15. The electrical connector according to claim 12, wherein said planar connecting portions are separated by a space of a predetermined interval, and are disposed in front of and in rear of said space.

16. An electrical connector for a vehicle lamp, comprising:
a connector housing formed from an insulating material; and
a plurality of electrically conductive terminals each having a generally planar connecting portion inserted into said connector housing, said planar connecting portions of said plurality of electrically conductive terminals lying substantially in a single plane;
an insulated wire connected to each of said terminals, all of the insulated wires extending outward from a first side of said connector housing in a direction parallel to said plane;
the connector body comprising:
a main body having sleeves formed therein for receiving respective ones of said terminals through respective openings formed in a base portion of said main body;
a lid for covering said openings in said main body; and
a hinge formed on a second side of said main body opposite said first side, said hinge connecting said lid to said main body;
wherein an L-shaped groove is formed in said base portion for guiding one of said insulated wires connected to a first of said terminals around a second of said terminals and out of said housing.

17. A lighting circuit device for an automotive lamp, comprising:
a lighting circuit module comprising:
a molded lighting circuit module case; and
a pair of terminals extending outward from a side surface of said case, said terminals being generally planar and lying in the same plane, and
an electrical connector mating with said pair of terminals for connecting said lighting circuit module to make electrical connection to said pair of terminals, said electrical connector comprising:
a connector housing formed from an insulating material; and
a plurality of electrically conductive terminals each having a generally planar connecting portion inserted into said connector housing, said planar connecting portions of said plurality of electrically conductive terminals of said electrical connector lying substantially in a single plane, said electrically conductive terminals making electrical contact with respective ones of said terminals of said lighting circuit module;
an insulated wire connected to each of said terminals of said electrical connector, all of the insulated wires extending outward from a first side of said connector housing in a direction parallel to said single plane;

wherein the connector body comprises:
  a main body having sleeves formed therein for receiving respective ones of said terminals through respective openings formed in a base portion of said main body;
  a lid for covering said openings in said main body; and
  a hinge formed on a second side of said main body opposite said first side, said hinge connecting said lid to said main body;

wherein an L-shaped groove is formed in said base portion for guiding one of said insulated wires connected to a first of said terminals around a second of said terminals and out of said housing.

18. A lighting circuit device for an automotive lamp, comprising:
  a lighting circuit module comprising:
    a molded lighting circuit module case; and
    a pair of terminals extending outward from a side surface of said case, said terminals being generally planar and lying in the same plane, and
  an electrical connector mating with said pair of terminals for connecting said lighting circuit module to make electrical connection to said pair of terminals, said electrical connector comprising:
    a connector housing formed from an insulating material; and
    a plurality of electrically conductive terminals each having a generally planar connecting portion inserted into said connector housing, said planar connecting portions of said plurality of electrically conductive terminals of said electrical connector lying substantially in a single plane, said electrically conductive terminals making electrical contact with respective ones of said terminals of said lighting circuit module;
  wherein said molded lighting circuit module case comprises a pair of generally U-shaped guide walls bracketing said terminals of said lighting circuit module; and
  wherein one of said walls of said pair of walls has a U-shaped opening having a width larger than that of the other of said walls.

19. An automotive lamp comprising:
  a lamp body assembly comprising:
    a lamp body and a lens assembled to said lamp body, said lamp body having a bottom wall, a lamp chamber being defined by the assembled lamp body and lens;
    a reflector mounted within said lamp chamber;
    a discharge lamp mounted on said reflector; and
    an extension member defining a gap chamber between said bottom wall of said lamp body and said extension member,
  a lighting circuit module comprising:
    a molded lighting circuit module case mounted in said gap chamber; and
    a pair of terminals extending outward from a side surface of said case, said terminals being generally planar and lying in the same plane, and
  an electrical connector mating with said pair of terminals for connecting said lighting circuit module to make electrical connection to said pair of terminals, said electrical connector comprising:
    a connector housing formed from an insulating material; and
    a plurality of electrically conductive terminals each having a generally planar connecting portion inserted into said connector housing, said planar connecting portions of said plurality of electrically conductive terminals of said electrical connector lying substantially in a single plane, said electrically conductive terminals making electrical contact with respective ones of said terminals of said lighting circuit module;
  an insulated wire connected to each of said terminals of said electrical connector, all of the insulated wires extending outward from a first side of said connector housing in a direction parallel to said single plane;
  wherein said connector body comprises:
    a main body having sleeves formed therein for receiving respective ones of said terminals through respective openings formed in a base portion of said main body;
    a lid for covering said openings in said main body; and
    a hinge formed on a second side of said main body opposite said first side, said hinge connecting said lid to said main body;
  wherein an L-shaped groove is formed in said base portion for guiding one of said insulated wires connected to a first of said terminals around a second of said terminals and out of said housing.

* * * * *